No. 720,663.  
PATENTED FEB. 17, 1903.  
E. W. BURGESS.  
PITMAN CONNECTION.  
APPLICATION FILED JUNE 9, 1902.  
NO MODEL.  
2 SHEETS—SHEET 1.

Witnesses  
Inventor  
Edward W Burgess

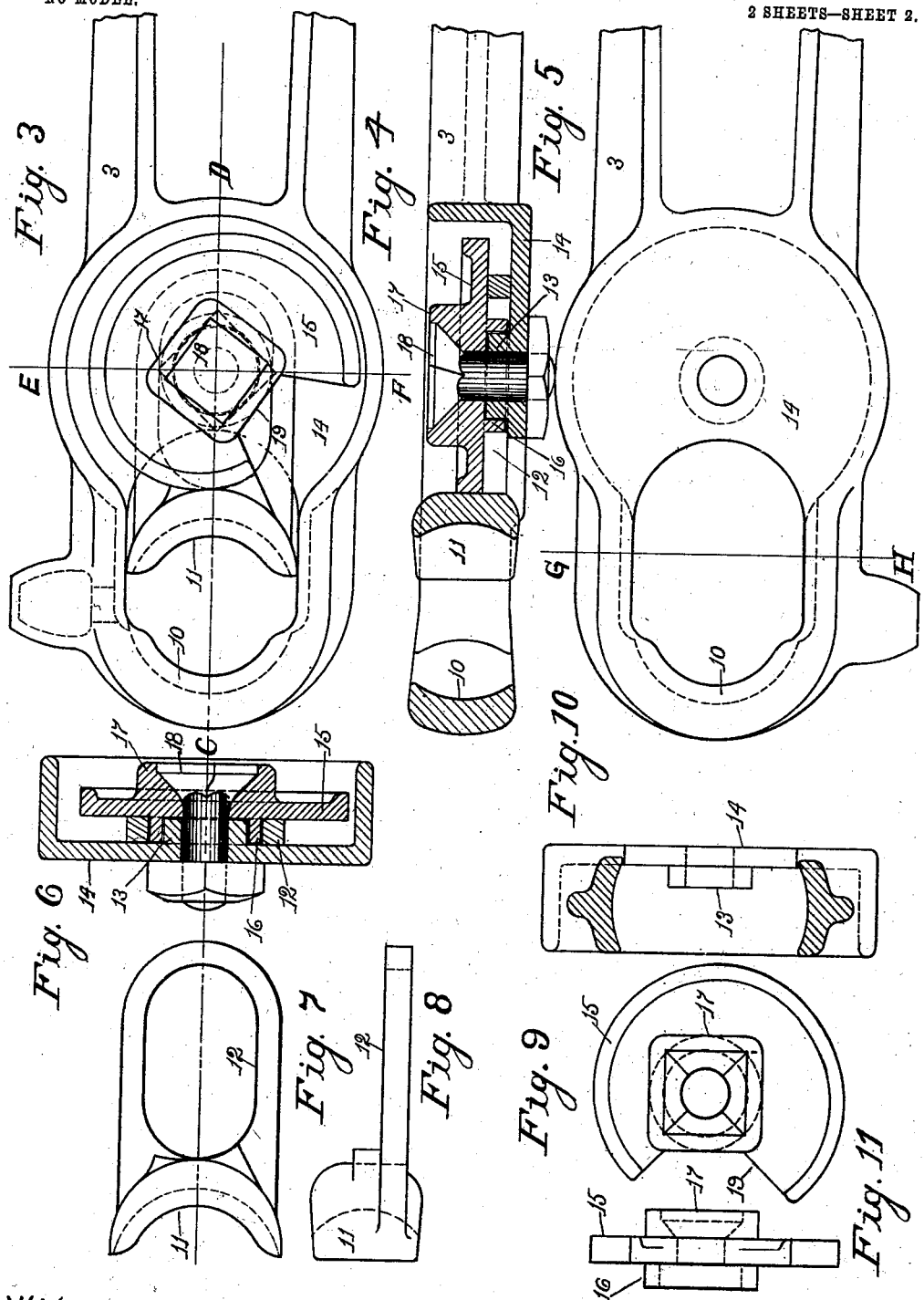

UNITED STATES PATENT OFFICE.

EDWARD W. BURGESS, OF MILWAUKEE, WISCONSIN, ASSIGNOR TO INTERNATIONAL HARVESTER COMPANY, A CORPORATION OF NEW JERSEY.

PITMAN CONNECTION.

SPECIFICATION forming part of Letters Patent No. 720,663, dated February 17, 1903.

Application filed June 9, 1902. Serial No. 110,769. (No model.)

*To all whom it may concern:*

Be it known that I, EDWARD W. BURGESS, a citizen of the United States, residing at Milwaukee, in the county of Milwaukee and State of Wisconsin, have invented certain new and useful Improvements in Pitmen Connections, of which the following is a specification, reference being had to the accompanying drawings, forming a part thereof.

My invention relates to improvements in pitmen connections in which means are provided for an adjustment of parts to compensate for wear; and the object of my improvements is to provide a connection that can be quickly adjusted and one that cannot become cramped in any of its movements. I attain these objects by the mechanism illustrated in the accompanying drawings, in which—

Figure 1:
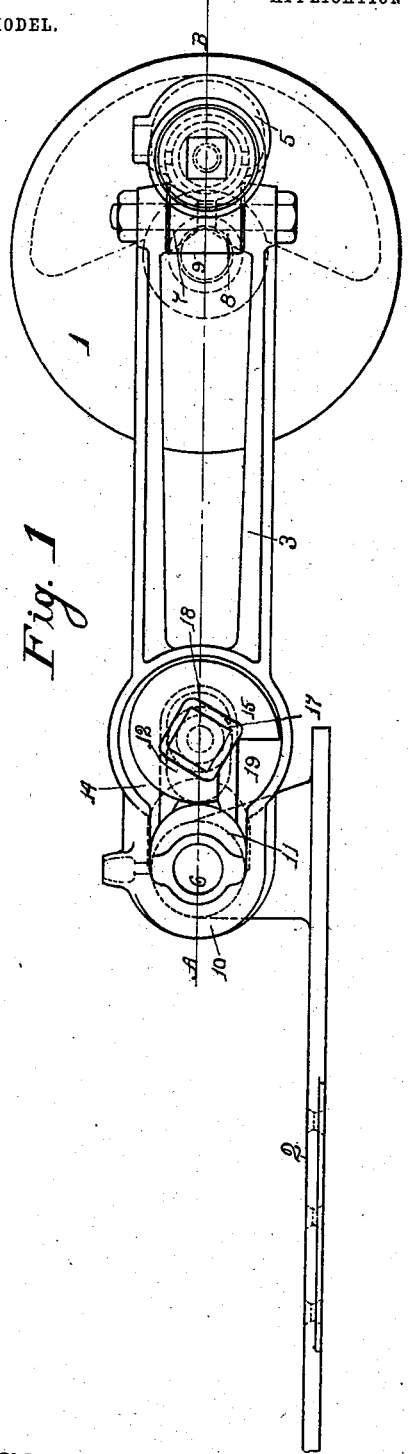
Figure 2:
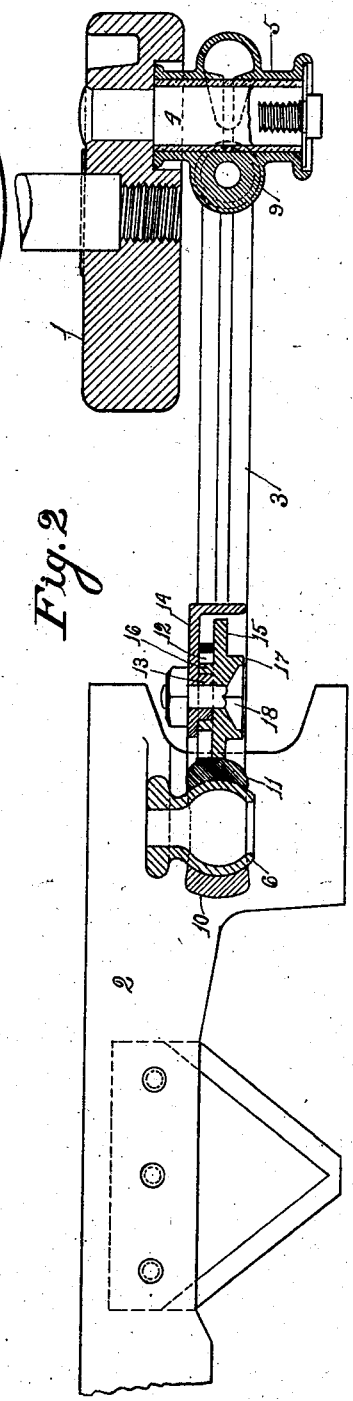

Figure 1 is an elevation, and Fig. 2 is a horizontal cross-section on line A B, Fig. 1. Fig. 3 is an elevation, drawn full size, of the end of the pitman that connects with the knife. Fig. 4 is a section on line C D of Fig. 3. Fig. 5 is a rear view of Fig. 3. Fig. 6 is a section on line E F of Fig. 3. Fig. 7 is a plan view of the movable half-box, and Fig. 8 is an elevation of Fig. 7. Fig. 9 is a plan view of the clamping-washer. Fig. 10 is a section on line G H of Fig. 5, and Fig. 11 is an elevation of Fig. 9.

1 is the crank-wheel; 2, the knife; 3, the pitman; 4, the crank-pin; 5, the crank-box; 6, the ball on the knife-heel. The pitman is forked at the crank-wheel end and has oppositely-disposed cone-shaped bearings 7 and 8, that are seated in like-shaped cavities formed in the ear 9 of crank-box 5. The opposite end of the pitman has a half-box 10 integral therewith to receive a part of the ball 6. 11 is the other half-box, having the slotted tailpiece 12.

13 is a boss projecting outward from the wall 14 of the pitman 3.

15 is a washer the periphery of which is an involute curve. A cylinder 16 forms a portion of the back of the washer and passes through the slotted tailpiece 12 in the half-box 11 and surrounds the boss 13. The length of the cylinder is less than the thickness of the tailpiece and greater than the length of the boss 13. On its face the washer is provided with an angular boss 17, which is countersunk to receive the head of a plow-bolt 18, the bolt passing through the washer and the wall 14 and receiving the nut outside of the wall. The washer 15 has a gap 19 in its periphery, as shown in Fig. 1. The purpose of the gap is to allow the half-box 11 to be moved far enough back when the washer is in position to bring the gap opposite the half-box to admit the ball on the knife-heel between the two half-boxes.

The operation of the device is as follows: The forked end of the pitman is spread apart, and the cone-shaped bosses are seated in the bearings on the crank-box and a through-bolt holds them in adjustment, the bolt being strained sufficient to hold them from rattling and still allow a movement on the pivot-bolt to prevent a cramping of the box on the crank-pin. The half-box 11 is moved back into the gap in the washer, and the pitman is moved into place with the ball on the knife-heel between the two half-boxes. The washer 15 is then turned, and its periphery gradually receding from the center and acting against the back of the half-box 11 forces it against the ball, which is thus held between the two half-boxes. The bolt 18 being drawn tight clamps the tailpiece 12 against the wall 14 and holds the half-box 11 against movement. The half-boxes grasping the ball on the knife-heel are free to swing around its center to a limited extent in any direction, and thus all liability of a cramping at this point is removed and any wear of the parts may be compensated for by adjusting the movable half-box 11.

What I claim as my invention, and desire to secure by Letters Patent, is—

1. In a pitman connection that has one part of a journal-box adjustable relative to the other, the combination of the pitman and the fixed part, a movable part provided with a longitudinal slot, a cam-washer having a cylindrical portion, that passes through the slot in the washer and is pivoted on the pitman, a bolt passing through said hub and pitman to clamp the washer against the movable part of the half-box.

2. The combination to form a pitman connection, of a wrist-pin, a pitman, a half-box integral therewith, a half-box adjustable thereon, said adjustable part provided with a slotted extension, a washer having a cam-shaped periphery acting against the movable half-box, and a cylindrical part that passes through the slotted extension and is pivoted on the pitman, and means for clamping the washer to the pitman and against the half-box.

3. The combination to form a pitman connection, of a wrist-pin, a pitman, a half-box integral therewith, a half-box adjustable thereon, said adjustable part provided with a slotted extension, a washer having a cam-shaped periphery, acting against the movable half-box, and a cylindrical part that passes through the slotted extension of the movable half-box and is pivoted to the pitman, means for turning the washer on its pivot, and a bolt that clamps it against the movable half-box.

4. The combination to form a pitman connection; of a wrist-pin, a pitman, a half-box integral therewith, a half-box adjustable thereon, said adjustable part provided with a slotted extension, a washer having a cam-shaped periphery acting against the movable half-box, a cylindrical part that passes through the slotted extension of the movable half-box and is pivoted to the pitman, an angular boss on the face of the washer, by which it may be turned, and a bolt that holds the washer and movable half-box to the pitman.

5. The combination to form a pitman connection, of a wrist-pin, a pitman, a half-box, non-adjustable thereon, a half-box adjustable thereon, said adjustable part provided with a slotted extension, a washer having a cam-shaped periphery acting against the movable half-box, a cylindrical part that passes through the slotted extension of the movable half-box and is pivoted to the pitman, means for turning the washer on its pivot and means for clamping it against the movable half-box.

6. The combination to form a journal-box for a pitman connection, of a stationary half-box, a movable half-box adjustable toward the stationary half-box, an adjusting-washer having a cam-shaped periphery acting against the movable half-box, said washer being pivoted on the pitman, and means for clamping the washer against the half-box and to the pitman.

7. In a pitman connection, the combination of the crank-wheel and wrist-pin, a reciprocating part having a journal attached thereto, a pitman having a fixed half-box connected therewith, a half-box movable on the pitman, and adapted in connection with the fixed half-box to form a journal-box, said half-box provided with a slotted extension, a washer that has a cam-shaped periphery acting against the movable half-box and extending across the slotted extension, a boss on the pitman, cylindrical projection on the back of the washer, that pivots on the said boss, a bolt that passes through the washer, and the boss on the pitman and means for turning the washer on its pivot.

8. In a pitman and pitman connection, the combination of a crank-wheel and crank-pin, a journal-box for the crank-pin, said journal-box having a projection on one side that has cavities on opposite sides thereof adapted to receive cone-shaped bosses, forming a part of the forked end of the pitman, and a bolt that secures the forked end to the said projection, the said pitman provided at its opposite end with a half-box integral therewith, and an adjustable half-box with means for securing the adjustable half-box to the pitman.

In witness whereof I hereto affix my signature in presence of two witnesses.

EDWARD W. BURGESS.

Witnesses:
FRANK J. DRYBURGH,
EARLE J. BRYDEN.